United States Patent [19]
Larsen

[11] Patent Number: 6,098,663
[45] Date of Patent: Aug. 8, 2000

[54] HIGH IMPACT BELLOWS

[76] Inventor: Richard R. Larsen, 4153 Shady La., Cookeville, Tenn. 38506

[21] Appl. No.: 09/060,724

[22] Filed: Apr. 15, 1998

[51] Int. Cl.$^7$ ...................................................... F16L 55/04
[52] U.S. Cl. ............................. 138/30; 138/121; 218/135
[58] Field of Search ............................. 138/30, 31, 121, 138/118; 218/135

[56] References Cited

U.S. PATENT DOCUMENTS

| | | | |
|---|---|---|---|
| 3,061,039 | 10/1962 | Peters ......................................... | 138/30 |
| 3,794,080 | 2/1974 | Huston et al. ........................... | 138/121 |
| 4,079,757 | 3/1978 | Fischer et al. ........................... | 138/121 |
| 4,585,913 | 4/1986 | Yorita ....................................... | 138/121 |
| 4,712,642 | 12/1987 | Lalikos et al. ........................... | 138/121 |
| 5,492,151 | 2/1996 | Wood et al. .............................. | 138/121 |
| 5,704,401 | 1/1998 | Fukui et al. .............................. | 138/121 |

*Primary Examiner*—James Hook
*Attorney, Agent, or Firm*—James A. Hudak

[57] ABSTRACT

A bellows structure for use in high velocity, linear motion applications and which incorporates self-damping is disclosed. The bellows structure utilizes a plurality of thicker convolutions at each end of a regular bellows section to join the bellows section to its terminations. The thicker convolutions are distributed asymmetrically with the greater number of thicker convolutions being placed adjacent the stationary end of the bellows. The bellows structure increases the energy absorption capabilities of the stationary end of the bellows, and causes the intersecting, energy-absorbing waves traveling through the bellows section to intersect more frequently resulting in their internal cancellation.

1 Claim, 6 Drawing Sheets

Fig. 5A (PRIOR ART)
BELLOWS STATIC & OPEN, SWITCH CLOSED.

Fig. 5B (PRIOR ART)
SWITCH BEGINS TO OPEN, BELLOWS CONVOLUTIONS BEGIN STICKING AGAINST MOVEABLE TERMINATION.

Fig. 5C (PRIOR ART)
SWITCH MECHANISM HITS BUMPER AND BEGINS TO REBOUND.

Fig. 5D (PRIOR ART)

SWITCH MECHANISM REACHES MAXIMUM REBOUND AND BEGINS TO RETURN. BELLOWS STACK IS THROWN AGAINST STATIONARY TERMINATION. CONVOLUTIONS STRETCHED OPEN AT MOVEABLE TERMINATION.

Fig. 5E (PRIOR ART)

MECHANISM COMES TO REST, BUT BELLOWS CONTINUE TO OSCILLATE BETWEEN TERMINATIONS, OPENING THE END CONVOLUTION WIDELY 5 OR 6 TIMES.

Fig. 5F (PRIOR ART)

MECHANISM COMES TO REST, BUT BELLOWS CONTINUE TO OSCILLATE BETWEEN TERMINATIONS, OPENING THE END CONVOLUTION WIDELY 5 OR 6 TIMES.

Fig. 6A
BELLOWS STATIC & OPEN; SWITCH CLOSED.

Fig. 6B
SWITCH BEGINS TO OPEN, REGULAR CONVOLUTIONS BEGIN STACKING AGAINST THICKER, HIGH IMPACT CONVOLUTIONS. HIGH IMPACT CONVOLUTIONS EXHIBIT LITTLE COMPRESSION DUE TO STIFFNESS.

Fig. 6C
SWITCH MECHANISM HITS BUMPER AND BEGINS TO REBOUND. REGULAR BELLOWS CONVOLUTIONS LOAD AGAINST HIGH IMPACT CONVOLUTIONS CAUSING THEM TO COMPRESS. BEGINNING OF LOADING INDUCES FIRST REGULAR WAVE BACK INTO REGULAR CONVOLUTIONS.

Fig. 6D

SWITCH MECHANISM REACHES MAXIMUM REBOUND AND BEGINS TO RETURN. HIGH IMPACT CONVOLUTIONS ADJACENT TO IT OPEN SLIGHTLY UNDER PULLING LOAD. NUMEROUS INTERSECTING WAVES HAVE FORMED, AND CONTINUE TO PROPAGATE MORE.

Fig. 6E

SWITCH MECHANISM COMES TO REST. ENERGY CONTINUES TO DISSIPATE THROUGH INTERSECTING WAVES. OPENING AND CLOSING OF CONVOLUTIONS IS UNIFORM AND WELL DISTRIBUTED. END CONVOLUTIONS NEVER UNDERGO EXCESSIVE STRETCHING.

Fig. 6F

ENERGY CONTINUES TO DISSIPATE INTERNALLY WITHIN THE BELLOWS. VISUAL APPEARANCE UNDER HIGH SPEED IMAGING IS A FLUTTER ACROSS THE BELLOWS.

HIGH IMPACT BELLOWS

TECHNICAL FIELD

This invention relates, in general, to a bellows used in high velocity, linear motion applications and, more particularly, to a welded metallic bellows having a generally circular configuration for use in high voltage switchgear and to other types of bellows, such as hydroformed and mechanically formed bellows, fabricated from metallic or other materials.

BACKGROUND OF THE INVENTION

Bellows are used in a variety of applications such as pressure and motion sensing, sealing, surge arresting, mechanical and pressure actuation, flexible reservoirs, pumps, fluid isolators, etc. In most applications, the motion of the bellows is relatively slow, that is, the plurality of "folds" of the bellows, commonly referred to as "convolutions," expand or contract at generally the same rate. There are applications, however, where the motion of one end of the bellows relative to the other end of the bellows can be so rapid that the convolutions near the moving end begin to close while the convolutions adjacent the stationary end remain relatively motionless. Such a condition can occur because bellows are characteristically flexible devices, and the individual convolutions have sufficient mass causing them to resist rapid motion. When the moving termination of the bellows travels at a high rate of speed, the inertial resistance of the individual convolutions to such motion results in the progressive collapsing of the convolutions to a solid height beginning with the convolutions nearest the moving termination. Once a convolution collapses to a solid height, the convolution is accelerated to the velocity of the moving termination. This effect can be visualized through a common child's toy—a helical, highly flexial, flat, circular spring, commonly known as a "Slinky." If this toy is placed on a smooth surface with its coils spaced slightly open and then one end thereof is swept rapidly by one's hand toward the other end, the coils can be seen and heard stacking against the rapidly moving end while the coils at the opposite end are still stationary. This effect can be readily seen since the spring rate of this toy is extremely low so that even the relatively slow motion of one's hand can induce the aforementioned effect.

In certain bellows applications, the motion of the associated actuating mechanism that compresses the bellows can be extremely rapid. For example, during an electrical power disconnect, a high voltage puffer-type switch that is used to make and break electrical connections can typically move a distance of four inches within a period of 12 milliseconds. This type of switch, which can interrupt power service voltages up to 500,000 volts, utilizes an inert gas, sulfur hexafluoride or SF6, which is contained in the switch under pressure to "blow out" the electrical arc that is formed when the electrical contacts separate. In order to achieve arc extinguishment, the switch contacts are in the form of a piston in a closely fitting cylinder. As one contact, the piston, is rapidly separated from the other contact, the cylinder, a vacuum is formed inside the cylinder. As the edge of the piston passes the edge of the cylinder, SF6 rushes into the vacuum keeping the arc extinguished until the two contacts are sufficiently apart, thus preventing arcing. The SF6 is indispensable to achieve an arc-less disconnection. Without the SF6, an arc would bridge the contacts and the energy released would cause the switch to detonate, presenting a significant danger to workers and causing a power outage over a wide geographic area.

Developers of high voltage switchgear must achieve positive, long-term containment of SF6. To transmit mechanical motion into the sealed, pressurized chamber, a metallic bellows is used to join the linear motion actuating rod to the pressurized chamber. A metallic bellows, rather than a sliding seal, is utilized because of the impermeability of a metallic bellows and its relative insensitivity to extreme outdoor temperatures and atmospheric gases, such as ozone.

Metallic bellows provide a seal with a sufficiently low leak rate permitting a typical high voltage switch to remain in outdoor service for fifteen to twenty years. Historically, bellows manufacturers have experienced difficulty in providing more than 1000–2000 switch actuations before bellows failure. Such a failure rate was acceptable in the past, but changes in the power industry require longer and more reliable switch life, up to 40 years. The key issues affecting switching requirements and the use of SF6 to prevent switch arcing are:

1) The sale of electric power over long distances requires more frequent switching to redirect power to the end user;
2) SF6 is a powerful greenhouse gas that must be totally contained; and
3) The increasing competitiveness of the electric power industry requires that the switchgear have an operating life of three to four decades.

SF6 is a primary factor affecting bellows integrity. The use of this gas has come under close scrutiny by the Environmental Protection Agency because, while it is the least used volumetrically of the greenhouse gasses, it causes the most severe effects, as shown in Table 1 below.

TABLE 1

GREENHOUSE GASES

| GAS | AVERAGE RESIDENCE IN TROPOSPHERE, YEARS | GLOBAL WARMING POTENTIAL, GWP |
| --- | --- | --- |
| Carbon dioxide | <10 | 1 |
| Methane, CH4 | 10 | 25 |
| Nitrous oxides, N2Ox | 170 | 230 |
| Chlorofluorocarbons, CFCs | 60–100 | 15,000 |
| Sulfur hexafluoride, SF6 | 3,200 | 16,500 |

In addition to the atmospheric effects of SF6, or perhaps as a result of it, this gas is also subject to wide price fluctuations. From November 1994 to November 1996, the cost of SF6 increased by more than 500%, adding to the demand for efficient sealing and long service life. For these reasons, it has become necessary to develop a method of dramatically increasing the life of the bellows used to seal chambers containing SF6 gas, or the like.

Figure 1:
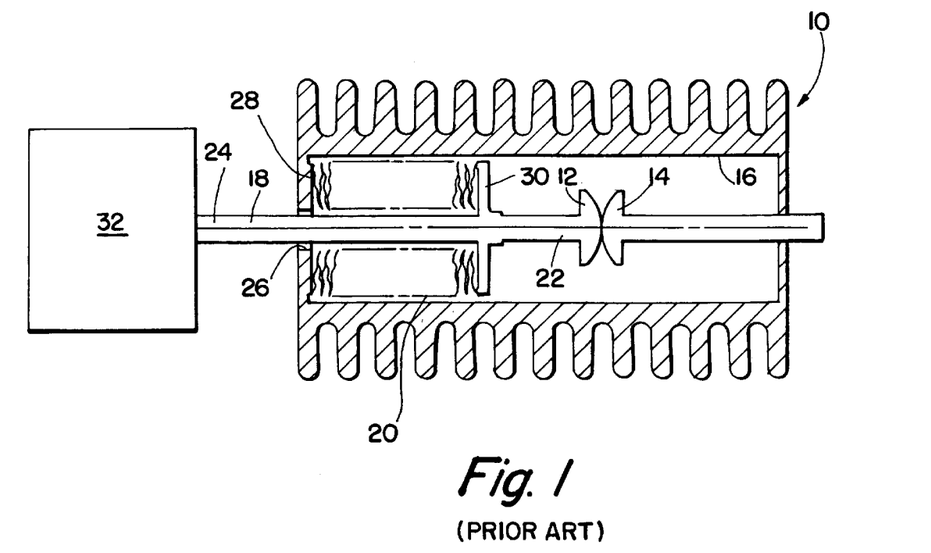
FIG. 1 is a cross-sectional view of a high voltage circuit interrupter with its internal contacts in the closed condition.
Figure 2:
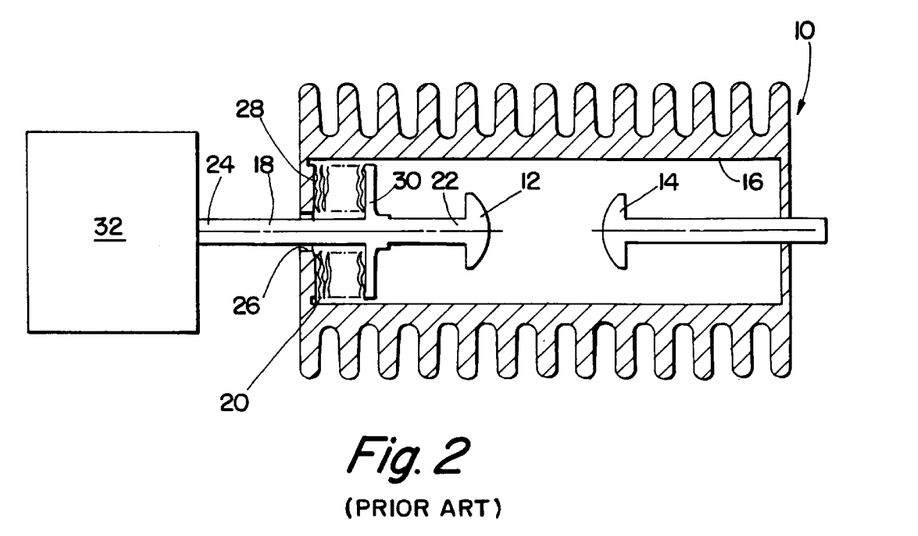
FIG. 2 is a cross-sectional view of a high voltage circuit interrupter with its internal contacts in the open condition.

To determine the behavior of metallic bellows during switchgear actuation, the motion of the bellows in a cutaway switchgear was studied using high speed video imaging. This analysis revealed the behavior of bellows when being compressed at a high linear velocity. When a high voltage puffer-type switch disconnects an electrical circuit, the seal bellows undergoes compression at velocities over 27 ft/sec. The bellows behavior is shown in FIGS. 1 and 2 and described as follows:

1. An actuation mechanism is utilized to deliver the energy stored within a large, preloaded spring to an actuating rod which passes through the housing of the switch to the movable contact therein. At the point where the rod passes into the switch housing, a seal bellows is positioned concentrically over the outside of the rod such that one end of the bellows is attached to the rod by means of a movable termination and the other end of the bellows is attached to the switch housing through a stationary termination.

2. As the actuation mechanism is tripped, releasing the preloaded spring, the actuating rod and its associated mechanism moves toward the left at a high rate of speed causing the electrical contacts to open and causing the bellows to collapse toward its solid height. At the end of the stroke of the actuating rod, its associated mechanism hits a mechanical stop, often configured as a hard rubber bumper, causing the mechanism and the rod to rebound off the stop.

3. The motion of a conventional bellows during this aforementioned action is not readily observable by the unaided eye. Without the aid of high-speed video imaging, the bellows simply appears to be translated from its extended length to its collapsed length, a distance of about four inches, in $\frac{1}{60}$ of a second or less.

The motion of the bellows as observed with high-speed video imaging is complex. Visually, the convolutions within the bellows appear to be swept up by the moving termination and thrown against the stationary termination where they rebound toward the moving termination. There is a brief moment when the convolutions are traveling toward the stationary termination and the moving termination is rebounding in the opposite direction. The result is that the convolutions nearest the moving terminations, i.e., the convolutions, that begin moving first, are stretched open to a width of up to double their normal free width. This stretching motion induces stresses in the affected convolutions of over twice the stress that the convolutions would experience in slow-speed, isometric motion. The resulting stress is greatest within the convolution adjacent the movable termination. At the stationary end, the almost solid mass of the fully collapsed bellows impacts the stationary termination. The stationary termination is solidly attached to the body of the switch housing, giving the system a high coefficient of restitution. Nearly all of the bellows convolutions impact the stationary termination as a solid mass in their closed, solid height condition, with the exception of a few convolutions that are near the moving termination and are being stretched open a distance substantially greater than their free width. All of the energy of the moving mass is delivered to the last convolution which is welded to the stationary termination.

In a typical electrical switchgear seal, a welded bellows may have an outside diameter of 1.37 in., a length of 4.50 in., and be fabricated from stainless steel strip material having a typical thickness of 0.006 in. A bellows of this size might weigh 0.375 lb. In operation, the bellows could travel a distance of 2 in. in extension from its free length to 2 in. in compression from its free length for a total distance of 4 in. At a typical velocity of 27.7 ft/sec, the kinetic energy delivered to the last convolution within this bellows is:

$$E = \frac{1}{2}MV^2 = Wv^2/2g = 4.5 \text{ ft-lbs}$$

This kinetic energy is delivered in less than a millisecond to the stationary termination through the last convolution adjoining it. The convolution, having a thickness of roughly two sheets of paper, is severely strained, and the resulting stress is concentrated at the interior diameter and exterior diameter welds of same. With a system coefficient of restitution of perhaps 0.8, 80% of the delivered energy is returned to the mass of the bellows as it rebounds away from the stationary termination. The bellows continues to act as an almost solid, compressed mass as it rebounds, but it is not solid since its structure is similar to that of a spring. After the rebound, the mass of closed convolutions travels back toward the moving termination. As the center of the bellows mass leaves the stationary termination, the convolutions closest to that termination are pulled open to roughly twice their free pitch, the most severe opening occurring at the convolution adjoining the stationary termination, i.e., the convolution that just received the 4.5 ft-lbs of kinetic energy. The convolutions adjacent the convolution adjoining the stationary termination are pulled open to a lesser degree nearer the moving mass of the bellows causing an oscillation that repeats for five or six diminishing cycles as the kinetic energy of the bellows is released in the form of internal heating.

It is apparent from the foregoing, that under the effects of high velocity, the convolutions of a bellows do not open and close isometrically as they would at low velocity. A small number of convolutions, roughly 10% of the convolutions located near the movable and stationary terminations, are subject to most of the flexing while the remaining 90% of the convolutions remain relatively closed and in a condition of rebounding from one termination to the other. It is also apparent that in a single switch closure, a small number of convolutions undergo the equivalent of five or six switch closures. Therefore, motion of the convolutions within a conventional bellows is not a one-for-one relationship with switch operation, but a five-to-one relationship for certain convolutions depending upon their location within the bellows.

In terms of vibration, the above described system is clearly an underdamped system. The bellows dissipates its energy sinusoidally within five or six cycles. The first and most obvious approach to remedy the problem of underdamping is to introduce damping in the form of a viscous system or through friction on the convolutions. Both approaches have been used to correct vibration-induced, premature bellows failures. Viscous damping involves pumping a fluid through a small orifice located in a termination positioned midway in the bellows and has been done successfully by NASA for a bellows used on a reaction wheel vibration isolation system on the Hubble Space Telescope. Coulomb damping by applying frictional drag to the edges of the outer diameter or inner diameter of the bellows has been used for many years. This latter approach is used where bellows are often employed as chemical pump rotary shaft seals. Bellows oscillations induced by pump vibration are dampened by a ribbon-type spring installed within the bellows housing. The repeated bends in the spring cause it to apply a load to weld beads on the outer diameter of the welded bellows. The frictional drag on the weld beads prevents the bellows from oscillating which would fatigue the bellows or lower the face load on the seal.

Viscous damping is impractical in switchgear applications for several reasons:

1. The wide ambient temperature range to which switchgear is subjected would result in wide variations in damping;
2. The existing space constraints of switchgear makes the addition of a viscous damping system impossible;
3. A liquid or semisolid material cannot be used within the switchgear because of possible contact contamination; and
4. The cost of a viscous damping system is several times the cost of the bellows seal, making it impractical.

Coulomb damping is a reasonable alternative for small vibrations, but is not suitable for long-stroke, high velocity motion for the following reasons:

1. Applying a direct drag against the bellows welds to a degree sufficient to dampen the levels of energy required induces severe wear on the weld beads and causes premature bellows failure;
2. Introducing additional frictional elements within the bellows to apply "drag" against other components outside the bellows violates space constraints; and
3. The cost of additional frictional elements to absorb the level of energy involved makes this approach impractical.

Another approach to overcoming the problems resulting from an underdamped system is to fabricate the bellows from different material thicknesses for the convolutions with the objective of creating bellows sections having a higher spring rate at each end of the bellows. It was thought that these higher spring rate sections would open up the nearly solid mass of closed convolutions by reflecting the kinetic energy back through itself in several smaller waves which were out of phase with respect to one another. A bellows was fabricated where approximately 12% of the total convolutions were made from material 29% thicker than the regular convolutions. These "heavier" convolutions were evenly distributed with 6% at each end of the bellows, and were welded to the movable and stationary terminations. The effect of this configuration increased bellows life by over 300%. High speed imaging disclosed how this occurred.

Tests of this latter bellows structure revealed that when the movable termination began compressing the bellows, the thicker convolutions adjoining the movable termination resisted the complete closure experienced by the regular bellows. The more gradual closure of the convolutions transferred some, but not all, of the kinetic energy to the adjoining regular convolutions and the transfer was not immediate resulting in a more gradual, progressive closure of the convolutions comprising the bellows. Ultimately, however, the entire bellows, with the exception of the thicker convolutions adjoining the stationary termination, became a solid mass and moved toward the stationary termination, compressing the thicker convolutions. At this point, the thicker convolutions, while being compressed, reflected a portion of their kinetic energy back through the nearly solid bellows mass so that a first wave was seen passing through it toward the movable termination. When the thicker convolutions became completely compressed, the convolutions reflected a second wave from the stationary termination. This second wave was out of phase with the first wave and traveled through the bellows behind the first wave. The end result was that the bellows was no longer a solid mass, but was broken into three regions with traveling waves acting as boundaries of the regions. The thicker convolutions near the stationary termination began to reopen, moving the divided bellows back toward the moving termination.

When the first wave encountered the thicker convolutions at the moving termination, a portion of energy within the wave was reflected back into the waves approaching it. The colliding waves each reflected a portion of their respective energy in opposite directions, and this reoccurred as each wave rebounded and collided with oncoming waves. The mass of the nearly solid bellows traveled only once toward the stationary end at the beginning of the operation, but then its motion resolved into a flutter-like effect throughout the entire bellows as each wave intersected another wave. These tests confirmed that the use of different spring rates strategically placed in the bellows could dramatically increase bellows life.

SUMMARY OF THE INVENTION

The present invention involves a passive approach to coulomb damping and does not use external devices, such as wear members or fluids, to achieve such damping. The structure of the present invention causes the kinetic energy of the moving bellows to be dissipated as heat throughout the entire bellows. As such, the present invention utilizes a plurality of thicker convolutions at each end of a regular bellows section that join this bellows section to its terminations. The addition of a single, thicker diaphragm at each end of a welded bellows is well known in the art. However, the single, thicker diaphragm is used for the purpose of attaching a welded bellows to its terminations following the heat treatment of the bellows under those circumstances where heat treating would damage the terminations. In such circumstances, the thicker, single diaphragm acts as an attachment means and is sufficiently strong so that it does not become a "weak link" as a result of the annealing that occurs in the diaphragm during the welding process. In contrast, a plurality of thicker convolutions, as in the present invention, provides energy dissipation. In addition, the thicker convolutions are distributed asymmetrically with a greater number being placed at the stationary end of the bellows. This configuration increases the energy absorption capabilities of the stationary end, and causes the intersecting, energy-absorbing waves that are traveling in opposite directions to intersect more frequently and randomly resulting in their internal cancellation.

An object of the present invention is to achieve a simple improvement in the life of seal bellows used in high velocity applications where the life improvement is on the order of at least 100% of presently available seal bellows life.

Another object of the present invention is to provide a readily retrofitable upgrade to existing bellows seal designs used in high voltage switchgear and the like without requiring redesign of the switchgear.

Yet another object of the present invention is to improve bellows reliability to afford a high degree of certainty that SF6 will be fully contained within the switch for three to four decades of operation without presenting a danger to the environment.

A further object of the present invention is to attain a more nearly isometric relationship of convolution motion such that stresses are not concentrated on one or two convolutions within the bellows.

Yet a further object of the present invention is to achieve a one-to-one relationship of bellows motion to switch actuation so that specifying switch life is substantially the same as specifying bellows cyclical life.

DESCRIPTION OF THE PREFERRED EMBODIMENT

Referring now to the drawings where the illustrations are for the purpose of describing the preferred embodiment of the present invention and are not intended to limit the invention described herein, FIG. 1 is a cross-sectional view of a high voltage circuit interrupter 10 with its internal contacts 12, 14 in the closed condition. The circuit interrupter 10 has a chamber 16 therein which receives contacts 12, 14, a piston rod 18 and a welded bellows seal 20. One end 22 of piston rod 18 is connected to contact 12 whereas the other end 24 of piston rod 18 is received through an aperture 26 provided in the end 28 of chamber 16 in circuit interrupter 10. Bellows seal 20 is received on piston rod 18 and is interposed between a circumferential flange 30 provided on piston rod 18 and end 28 of chamber 16 in interrupter 10. End 24 of piston rod 18 is connected to an actuating mechanism 32. Chamber 16 in circuit interrupter 10 is filled with an insulating gas, such as SF6 or the like.

When an electrical fault condition occurs, the actuating mechanism 32 is actuated causing piston rod 18 to move to the left resulting in the compression of bellows seal 20 and the opening of contacts 12, 14, as shown in FIG. 2. The insulating gas, SF6, prevents arcing between contacts 12, 14 during the opening of these contacts.

Referring now to FIG. 5, a series of cross-sectional views of a conventional bellows seal showing the deflection of same as a result of a high impact to the movable end thereof, such as would occur upon the opening of contacts in a circuit interrupter, is illustrated. FIG. 5A shows a bellows seal in a static state with the contacts in the normally closed condition. As the contacts begin to open, the convolutions within the bellows seal begin stacking against the movable terminations, e.g., the circumferential flange 30 on the piston rod 18 (FIG. 5B). In FIG. 5C, the mechanism associated with the movable contact hits a bumper (not shown) and begins to rebound. When the switch mechanism reaches maximum rebound and begins to return (FIG. 5D), the bellows stack is adjacent the stationary termination and the convolutions adjacent the movable termination are "stretched" open. In FIGS. 5E and 5F, the actuating mechanism has come to rest, but the bellows seal continues to oscillate between the stationary termination and the movable termination.

Figure 3:
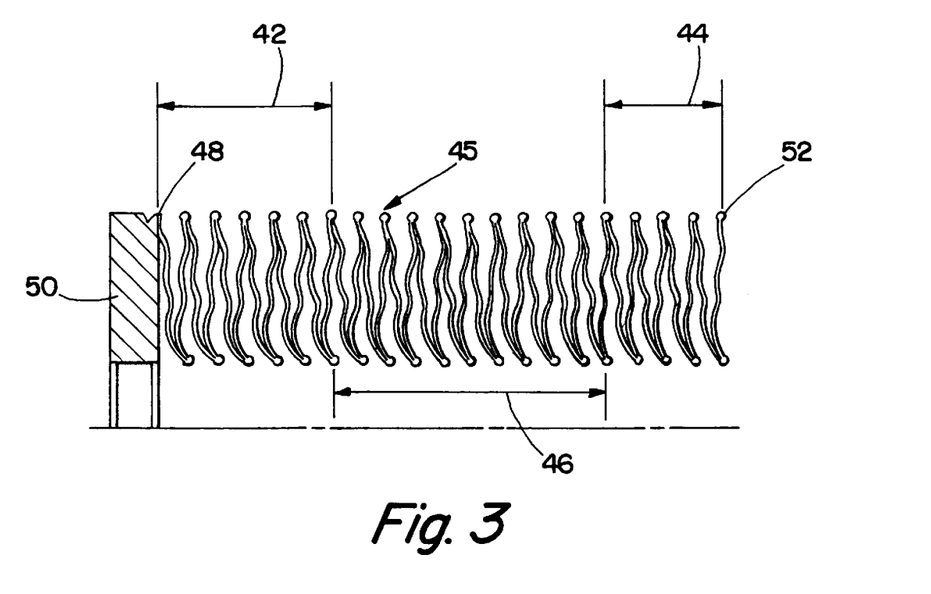
FIG. 3 is a cross-sectional view of the present invention illustrating the asymmetric placement of the high impact convolutions adjacent the ends of a regular bellows section.
Figure 4:
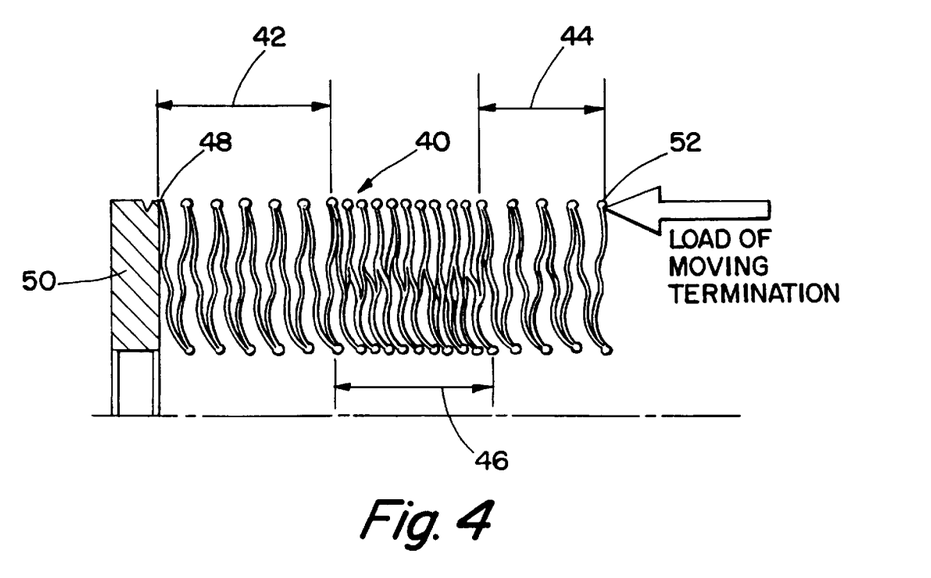
FIG. 4 is a cross-sectional view of the present invention illustrating the compression of the regular bellows convolutions between the high impact convolutions adjacent the ends of the regular bellows section.
Figure 5A:
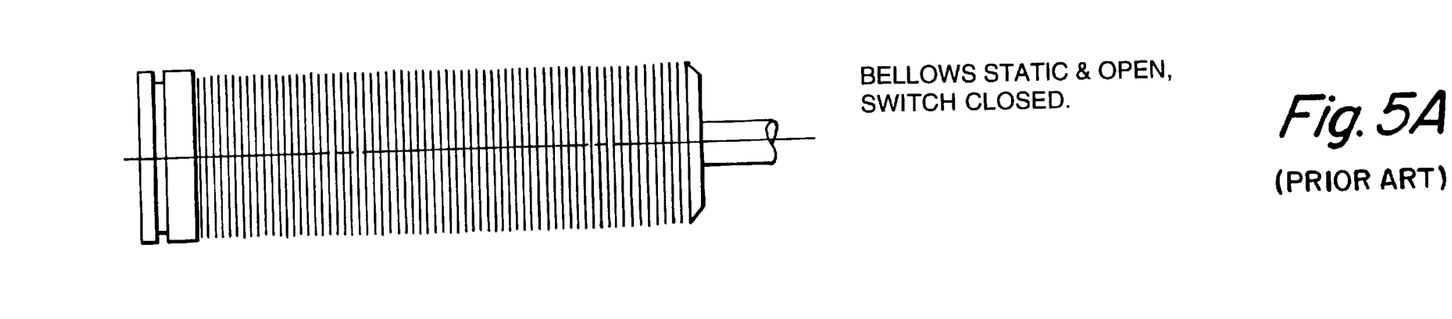
FIGS. 5a–f are a series of cross-sectional views of a conventional bellows arrangement without high impact convolutions on the ends thereof and illustrates the deflection of same as a result of a high impact to the movable end thereof.
Figure 5B:
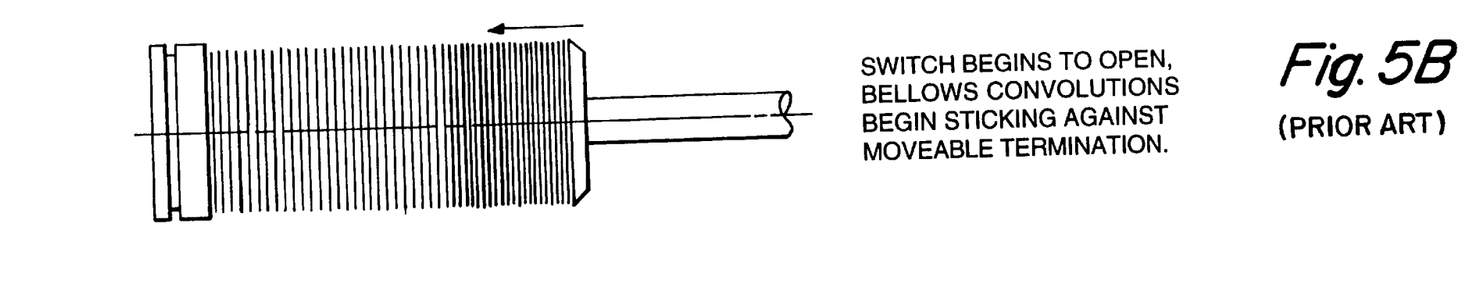
Figure 5C:
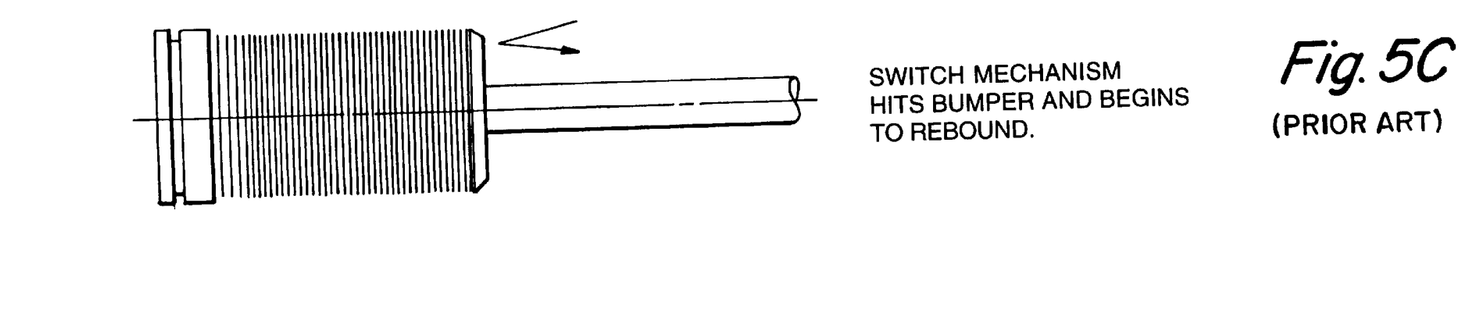
Figure 5D:
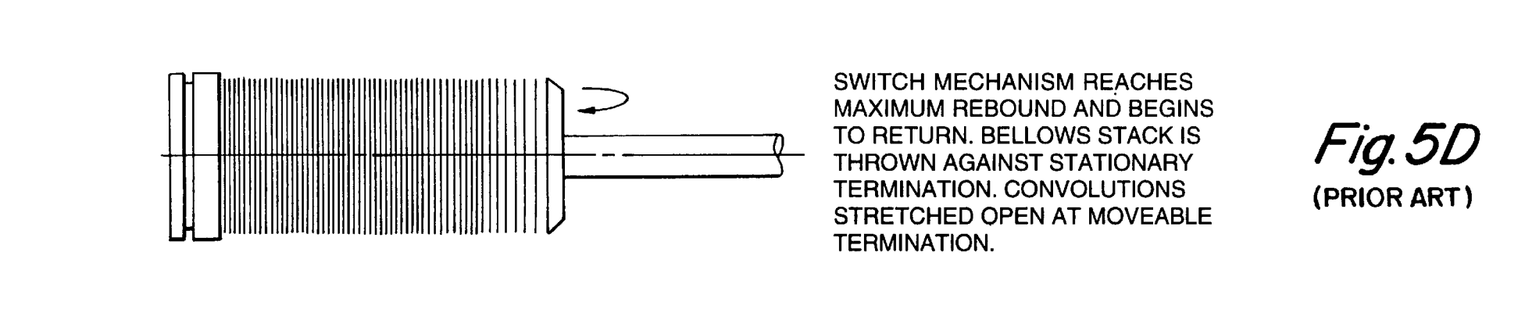
Figure 5E:
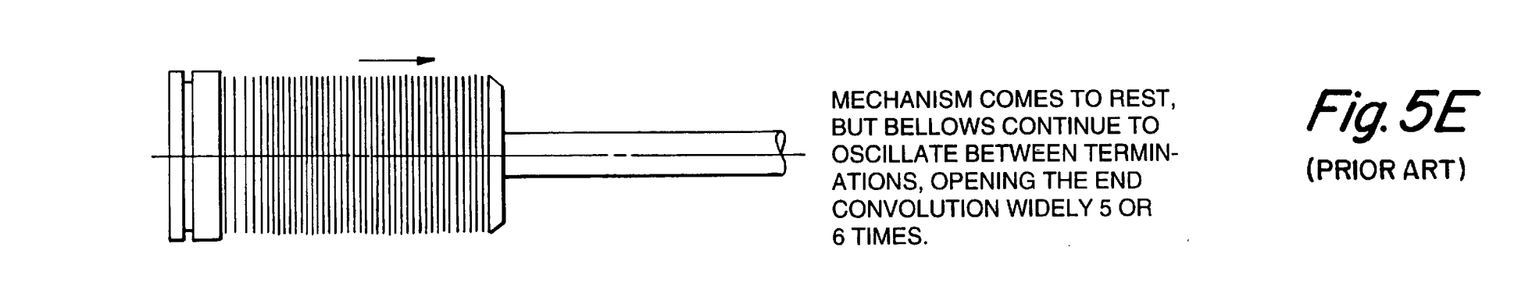
Figure 5F:
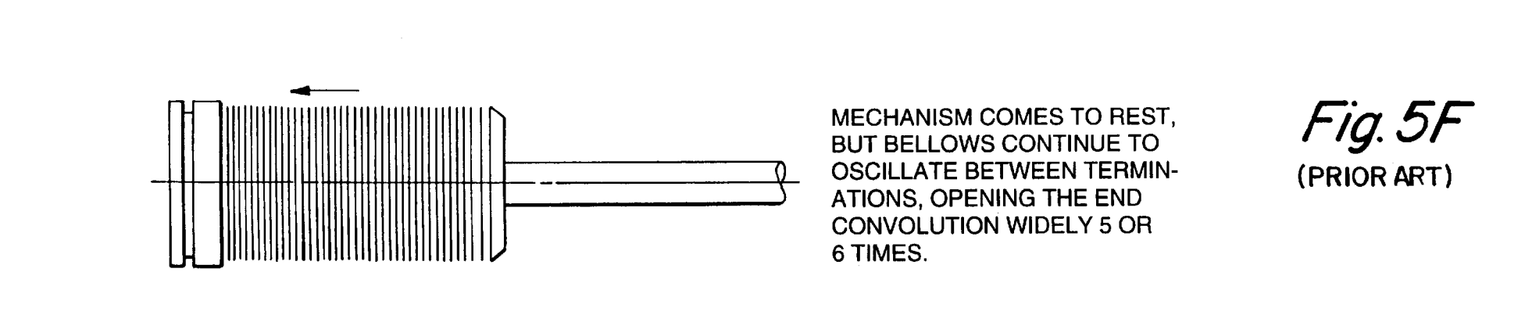
Figure 6A:
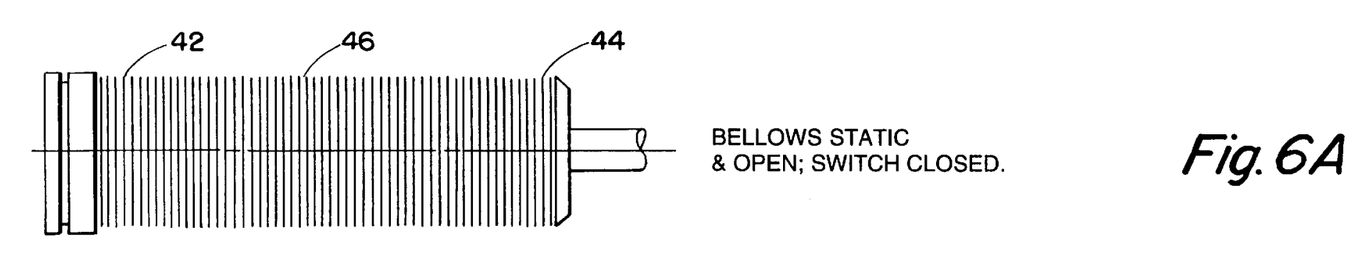
FIGS. 6a–f are a series of cross-sectional views of the present invention illustrating a bellows arrangement with high impact convolutions on the ends of a regular bellows section and showing the deflection of the bellows assembly as a result of a high impact to the movable end thereof.
Figure 6B:
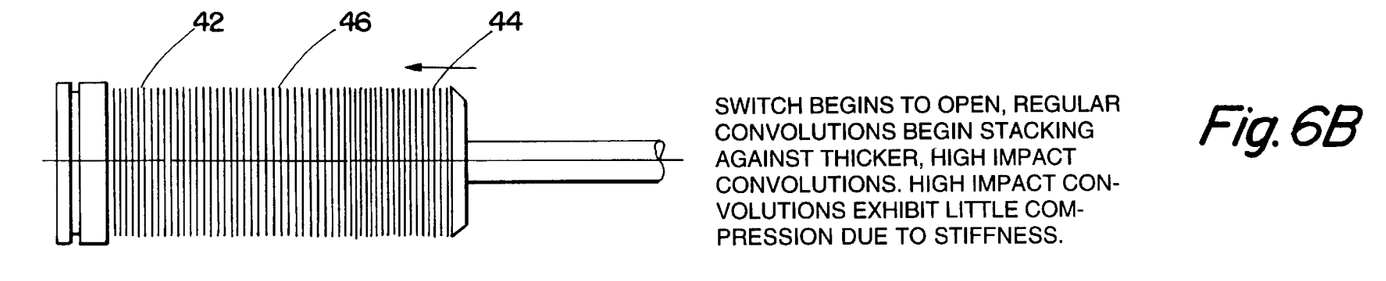
Figure 6C:
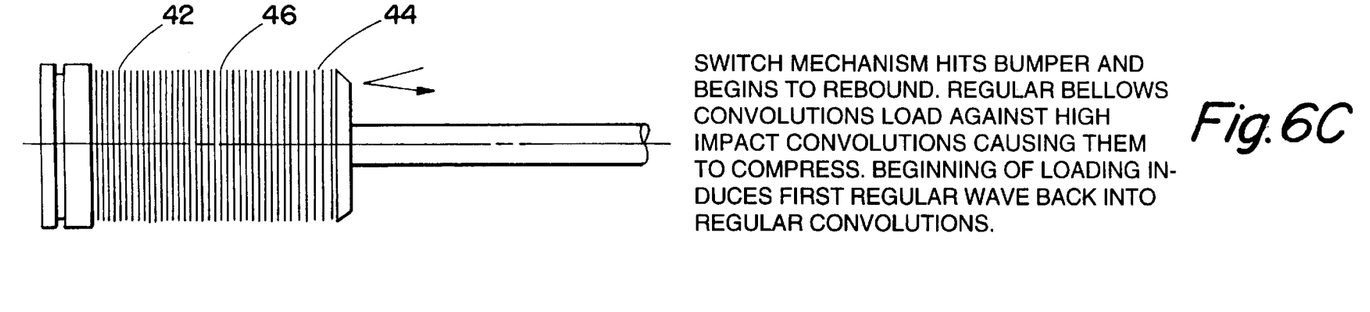
Figure 6D:
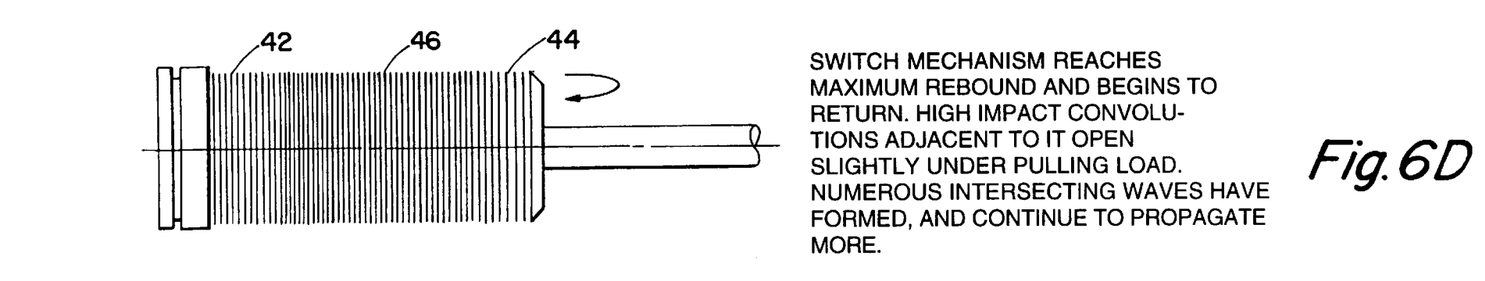
Figure 6E:
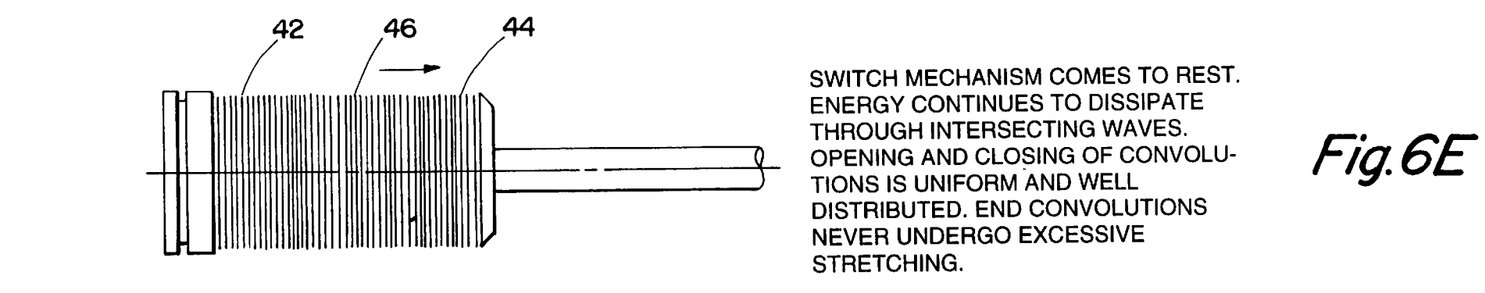
Figure 6F:
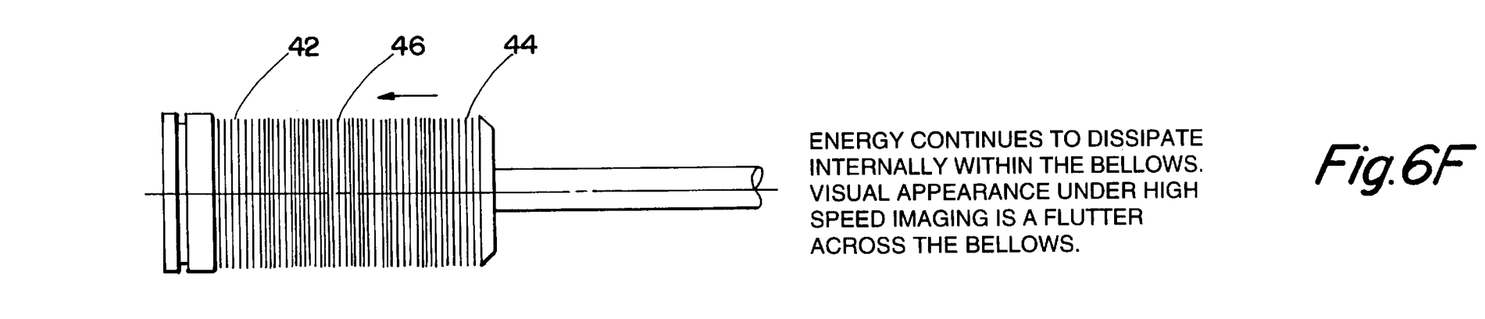

Referring now to FIG. 3, a cross-sectional view of the bellows 40 of the present invention is illustrated. Bellows 40 is comprised of a first region of high impact convolutions 42, a second region of high impact convolutions 44 and a region of regular convolutions 46 interposed between the first and second regions of high impact convolutions 42, 44. End 48 of first region of high impact convolutions 42 is attached to stationary termination 50, whereas end 52 of second region of high impact convolutions 44 is contacted by a movable termination (not shown). Each region of convolutions 42, 44 and 46 is comprised of diaphragms in an alternating stacked arrangement. The diaphragms comprising the first region of high impact convolutions 42 and the second region of high impact convolutions 44 are formed from metallic material approximately 20 to 30% thicker than the metallic material utilized for the diaphragms in the region of regular convolutions 46. In addition, the distribution of higher impact (thicker) convolutions is asymmetrical with respect to region of regular convolutions 46 with first region of high impact convolutions 42 having approximately 65% to 75% of the total number of high impact convolutions and second region of high impact convolutions 44 having approximately 25% to 35% of the total number of high impact convolutions. It has been found that by placing the greater number of high impact convolutions in the region adjacent the stationary termination 50, i.e., in the first region of high impact convolutions 42, greater energy absorption occurs causing the intersecting, energy-absorbing waves that are traveling in opposite directions to intersect more frequently resulting in the cancellation of the waves.

Referring now to FIG. 6, a series of cross-sectional views of the bellows 40 of the present invention showing the deflection of same as a result of a high impact to the movable end thereof, such as would occur upon the opening of contacts in a circuit interrupter, is illustrated. FIG. 6A shows the bellows 40 in a static state with the contacts in the normally closed condition. As the contacts begin to open, the region of regular convolutions 46 begins stacking against the second region of high impact convolutions 44 (FIG. 6B). In FIG. 6C, the mechanism associated with the movable contact hits a bumper (not shown) and begins to rebound. The region of regular convolutions 46 begin stacking against the first region of high impact convolutions 42 compressing convolutions 42. The beginning of loading of convolutions 42 causes a first wave to be reflected back into the regular convolutions 46. As the mechanism associated with the contact reaches maximum "rebound" and begins to return to its normal state, the high impact convolutions 42 open slightly under the "pulling" load, as shown in FIG. 6D. This action causes the formation of numerous waves which propagate along the bellows. As the mechanism associated with the contact comes to rest, energy continues to be dissipated by the intersecting waves, and the opening and closing of the convolutions is substantially uniform and well distributed across the bellows 40, as shown in FIG. 6E. It should be noted that the convolutions 42 and 44 are never subjected to excessive stretching. The energy continues to be dissipated within the bellows 40 and the visual appearance of the bellows 40 under high-speed imaging exhibits a "flutter" across the bellows 40, as shown in FIG. 6F.

It was observed in high speed video photography that increasing the number of intersecting waves generated during the first cycle of the bellows causes the convolutions to more rapidly dissipate energy across the entire bellows structure. The more uniform the dissipation of energy, the less concentrated the energy on the end convolutions resulting in a still greater increase in bellows cycle life. The asymmetric distribution of the higher spring rate convolutions at each end of the bellows increases the number of intersecting waves generated. This asymmetry, and the resulting generation of intersecting waves on the first cycle, causes the bellows to assume a much more uniform distribution of motion. Even with the aid of high speed video photography, the motion becomes difficult to ascertain, appearing as a uniform "flutter" of all the convolutions at the completion of the first cycle. The end convolutions experience no more motion than the convolutions in the center of the bellows, and there is no tendency to concentrate fatigue cracking near the end welds. Tests indicates that the life of bellows 40 is at least 500% greater than that of a conventional bellows structure.

The bellows 40 is most easily fabricated by a welded bellows construction, but it is obvious that it could also be fabricated as a formed bellows by building separate sections of bellows in the different thicknesses and then joining them together by soldering, brazing, welding or other means. In like manner, the principles disclosed herein could also be applied to non-metallic bellows such as those fabricated of PTFE or other elastomers. Some elastomeric bellows are machined from bar stock and could be machined to achieve the different diaphragms thicknesses required by this invention. Thus, the present invention applies to bellows of all types of construction.

While this invention benefits from the use of two different thicknesses of bellows, the heavier convolutions being placed at each end of the bellows in a asymmetric distribution, it is not limited to two thicknesses, but could have a third, fourth, or more thicknesses where the energy to be damped is still more severe. The result would be to introduce still more random waves from the intersections of the various bellows thicknesses.

Certain modifications and improvements will occur to those skilled in the art upon reading the foregoing. It is understood that all such modifications and improvements have been deleted herein for the sake of conciseness and readability but are properly within the scope of the following claims.

I claim:

1. A bellows structure comprising a first bellows section comprising a plurality of convolutions formed from diaphragms having a first thickness, a second bellows section comprising a plurality of convolutions formed from diaphragms having a second thickness, and a third bellows section comprising a plurality of convolutions formed from diaphragms having a third thickness, said first thickness of said diaphragms forming said plurality of convolutions in said first bellows section and said second thickness of said diaphragms forming said plurality of convolutions in said second bellows section being greater than said third thickness of said diaphragms forming said plurality of convolutions in said third bellows section, said third bellows section being interposed between said first and second bellows sections, and wherein the number of convolutions within said first bellows section is greater than the number of convolutions within said second bellows section.

* * * * *